Aug. 25, 1925.
F. T. MARTIN
VALVE CONTROL MECHANISM
Filed Feb. 4, 1924  3 Sheets-Sheet 1
1,551,505
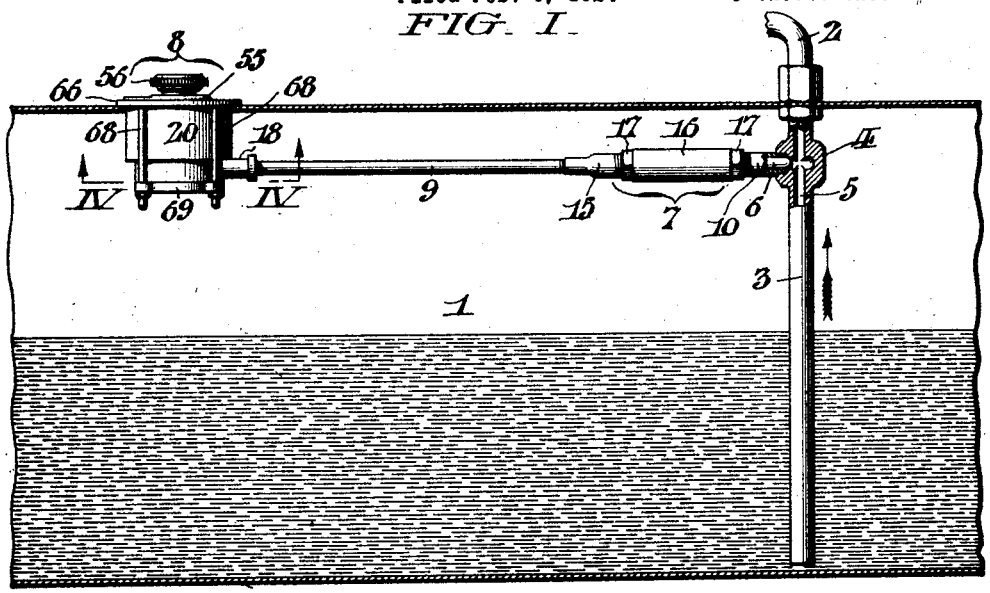
FIG. I.
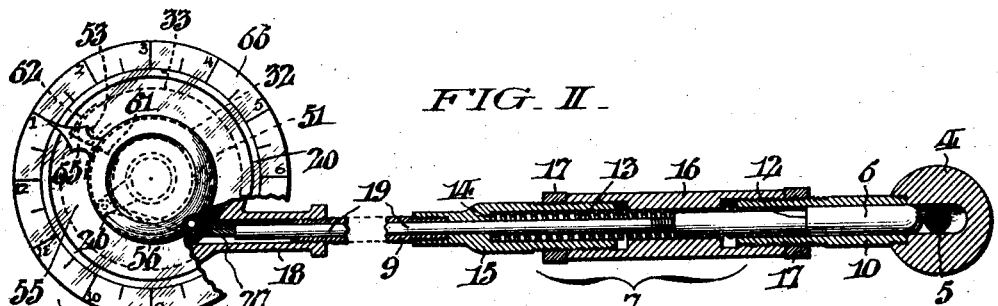
FIG. II.
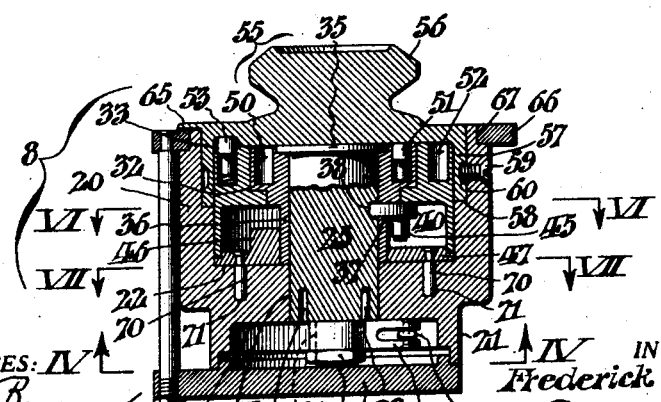
FIG. III.
WITNESSES:
John C. Bergner
Alfred E. Dschinger
INVENTOR:
Frederick T. Martin,
BY Frailey Paul
ATTORNEYS.

Aug. 25, 1925. 1,551,505
F. T. MARTIN
VALVE CONTROL MECHANISM
Filed Feb. 4, 1924  3 Sheets-Sheet 2
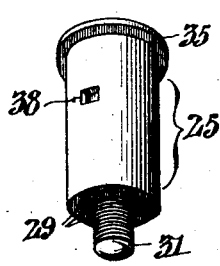
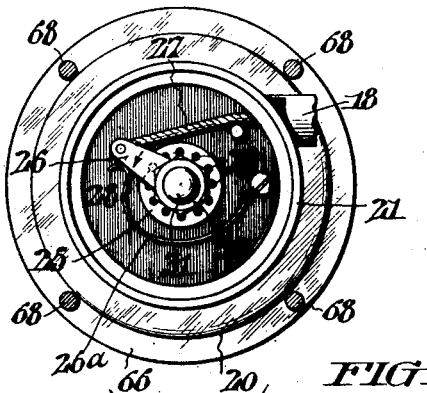
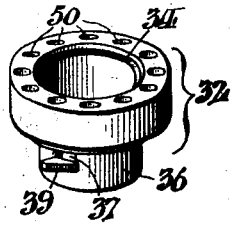
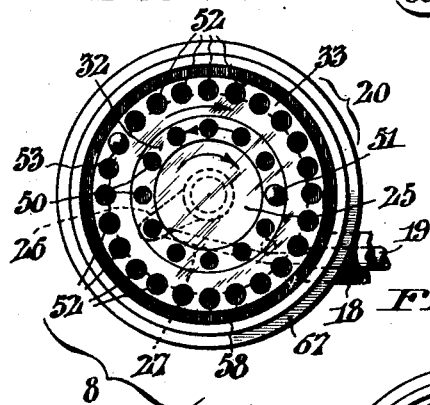
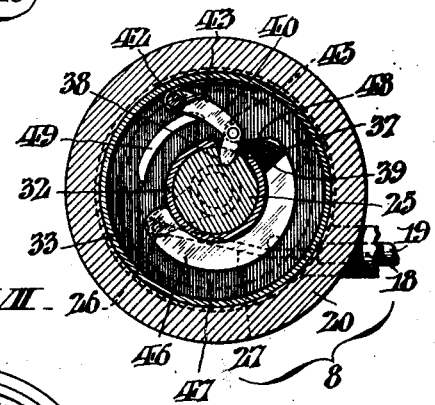
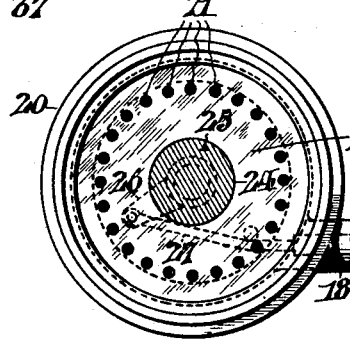
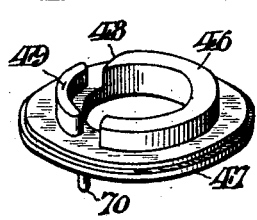
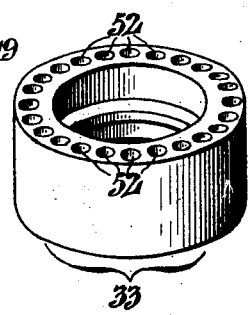
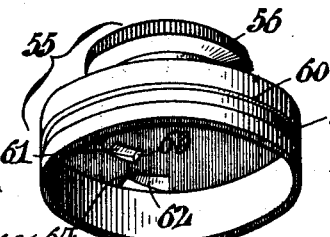
WITNESSES:
John E. Bergen
Alfred E. Ischinger
INVENTOR:
Frederick T. Martin,
BY Fraley & Paul
ATTORNEYS Aug. 25, 1925.
F. T. MARTIN
1,551,505
VALVE CONTROL MECHANISM
Filed Feb. 4, 1924    3 Sheets-Sheet 3
FIG. XIII.
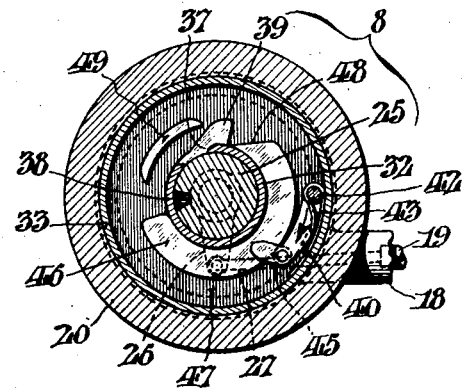
FIG. XIV.
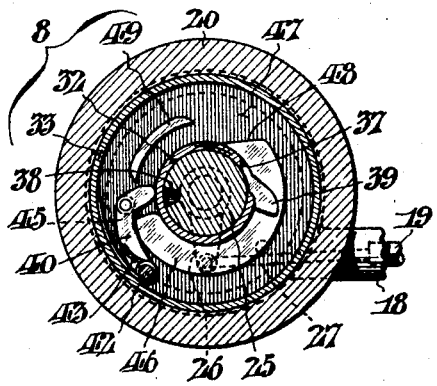
FIG. XV.
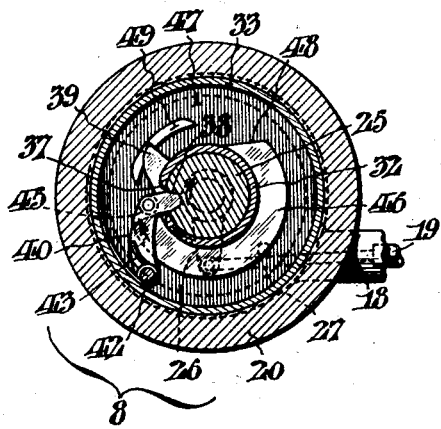
FIG. XVI.
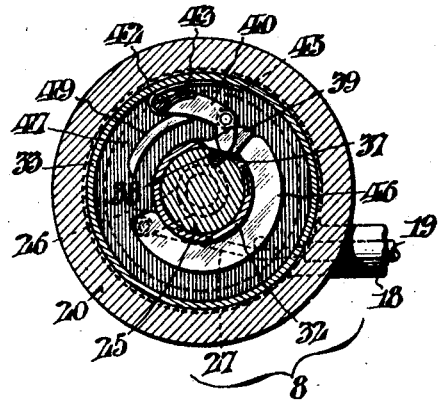
FIG. XVII.
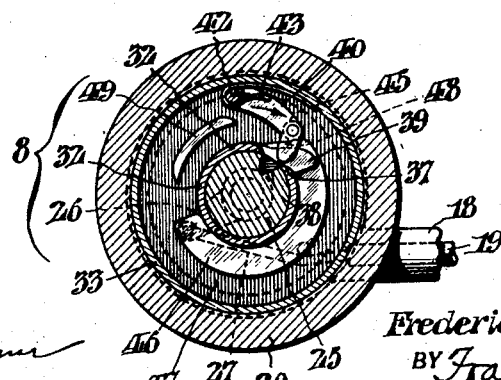
WITNESSES:
John C. Bergmi
Alfred E. Tschinger.
INVENTOR:
Frederick T. Martin,
BY Fahey Paul
ATTORNEYS.

Patented Aug. 25, 1925.

1,551,505

UNITED STATES PATENT OFFICE.

FREDERICK THOMAS MARTIN, OF MERION, PENNSYLVANIA, ASSIGNOR OF ONE-HALF TO JOHN J. GALLAGHER, OF MERION, PENNSYLVANIA.

VALVE-CONTROL MECHANISM.

Application filed February 4, 1924. Serial No. 690,475.

*To all whom it may concern:*

Be it known that I, FREDERICK T. MARTIN, a subject of Great Britain, residing in Merion, county of Montgomery, State of Pennsylvania, have invented certain new and useful Improvements in Valve-Control Mechanism, of which the following is a specification, reference being had to the accompanying drawings.

This invention relates to mechanism including a valve and a lock control therefor, and more particularly to mechanism capable of being used for example in connection with fuel supply systems of automobiles for the purpose of intercepting flow of fuel from the storage tank to the carbureter when the vehicle is left unattended, to prevent theft or unauthorized operation. In still more specific terms, the invention is concerned with a valve control mechanism involving a lock operative on the permutation principle.

The main object of my invention is to provide an organization of the kind referred to which is characterized by extreme simplicity both as to construction and operation, and which will prove sturdy and thoroughly reliable in long continued usage, notwithstanding careless or rough manipulation.

Other objects and attendant advantages of this invention will become readily apparent from the detailed description which follows of a typical embodiment thereof, its scope being clearly defined by the appended claims.

In the drawings, Fig. I is a fragmentary longitudinal sectional view of an automobile fuel tank equipped with a valve control mechanism typical of this invention.

Fig. II is a view of the mechanism by itself on a larger scale, with certain portions shown in plan and others in section.

Fig. III is an axial sectional view along diversely staggered planes through the lock forming a part of the organization.

Fig. IV is an inverted plan of the lock with the lower cover member removed as indicated by the arrows IV—IV in Figs. I and III.

Fig. V is a top plan of the lock with the actuating member and the coordinating dial removed to expose the permutation members whereby the locking is controlled.

Fig. VI is a horizontal sectional view taken as indicated by the arrows VI—VI in Fig. III showing how the component parts of the lock are positioned when the valve is open.

Fig. VII is a similar sectional view taken on a lower plane as indicated by the arrows VII—VII in Fig. III.

Fig. VIII is a perspective view of the actuating member of the lock.

Fig. IX is a perspective view of a combined cam and guard member forming a part of the lock.

Fig. X is a perspective view of the shaft or valve-operating member of the lock.

Figs. XI and XII are perspective views respectively of the two permutation members of the lock.

Figs. XIII, XIV, XV are sectional views similar to Fig. VI showing successive positions to which the various parts of the lock are moved to effect coupling of the permutation members and the shaft or valve-operating member.

Figs. XVI and XVII are illustrations similar to the preceding, showing the manner in which uncoupling is effected in the event of movement of either of the permutation members beyond the predetermined coupling positions.

Referring first to Fig. I of the drawings, the numeral 1 indicates, comprehensively, the storage tank from which the fuel is drawn, or forced under pressure, through a pipe connection partially shown at 2. The pipe connection 2 communicates interiorly of the tank 1 with a branch 3 that extends into close proximity to the tank bottom. Interposed in the branch 3 is a valve 4 whose through orifice 5 is controlled by a transversely slidable plunger 6 housed for guidance within a casing generally indicated at 7, and whose movements are controlled by a lock comprehensively designated by the numeral 8, the connections between the plunger casing 7 and said lock extending through an intervening tube 9.

The details of the valve 4 will be best understood by reference to Fig. II from which it will be noted that the head of the plunger 6 is disposed in the tubular end portion 10 of the casing 7, and that said plunger is shouldered as at 12, to provide abutment for a helical compression spring 13. At its opposite end the spring 13 abuts against the bottom of the cavity 14 in the other end part 15 of the casing 7. The members 10 and 15 are screw-threaded as shown to engage an intermediate casing part 16. This construction permits longitudinal adjustment of the casing 7 as may be required during installation of the organization in the tank 1. Jam nuts 17 adapted to be tightened against the opposite ends of the intermediate guide casing part 16, maintain it and the companion parts 10 and 15 in the desired adjusted positions. The tube 9, previously referred to, is threaded at one end into the member 15, and at its opposite end to a neck projection 18 of the lock housing, and serves as a guide for a rod 19 forming an axial extension of the valve plunger 6.

Coming now to an examination of the lock 8 and referring more particularly to Figs. III and XI inclusive, the housing of the same is designated by the numeral 20, said housing being cylindrical in configuration and reduced somewhat in diameter at its lower end as indicated at 21. The main or larger portion of the housing is hollow down to a level 22 and the reduced portion 21 recessed to a level 23 affording cavities for accommodating the various movable parts of the lock which will presently be described. The diaphragm or portion intervening between the surfaces 22—23 is bored axially as at 24 to receive a central shaft 25 which for convenience of nomenclature I will term the valve operating member of the lock 8, said shaft having affixed to its lower end a lever arm 26 which is connected by a flexible cable or the like 27, to the end of the rod extension 19 of the valve member 6. The lever arm 26, it will be observed, is disposed in the lower cavity of the lock housing 20, and in order to permit of its adjustment relative to the shaft 25, has an upstanding pin 28, engageable in any one of a circular series of apertures 29 in the face of an annular shoulder near the bottom end of the said shaft. This lever arm 26 is held against displacement by a nut 30 screwed upon the reduced axial prolongation 31 of the shaft 25 which receives the hub portion of said lever. A spring 26ª appropriately anchored in the lower cavity 23 of casing 20 is operative upon lever 26 to assist the spring 13 in shifting the valve plunger 6 to closed position when said lever is released by the lock 8.

Within the upper cavity 22 of the casing 20 and concentrically mounted for free and independent rotation about the shaft 25 are a pair of permutation members 32, 33 which are adapted to be moved in opposite directions as indicated by the arrows in Fig. V. As shown, these permutation members 32, 33 are in the form of sleeves, one fitting within the other, the inner one 32 of the pair being axially recessed as at 34 for engagement by a head 35 at the top of the shaft 25 whereby it is retained against displacement in the assemblage. The lower end of the sleeve 32 is reduced considerably as shown at 36, and this reduced portion has an aperture at one side as best shown at 37 in Fig. XI. By rotation of the sleeve 32, the aperture 37 may be brought into registry with a notch 38 in the side of the shaft 25 for a purpose which will be explained later. Adjacent the opening 37, the sleeve 32 is further provided with a cam projection 39 which will again be referred to hereinafter. The outer permutation member 33 has a working fit circumferentially within the main cavity 22 of the housing 20 and carries, in a hollow in its lower end, means for engaging the operating shaft 25, said means being in the form of a finger 40 which is fulcrumed on a stud 42 and yieldingly pressed inward toward said shaft 25 by a spring 43, see Fig. VI of the drawings. Mounted to the lower side of the finger 40 is a roller 45 designed to be acted upon by the cam projection 39 of the inner permutation member 32 and also by a cam ridge 46 upstanding from a plate 47 which is seated against and stationary within the bottom of the main cavity 22 of the housing 20. The cam ridge 46 is concentric with the axis of the shaft 25 and substantially semi-circular in extent with an inclined cam slope 48 at one end. Associated with the cam ridge 46 is a guard 49, which, when the end of finger 40 is engaged within the notch 38 of the shaft 25, maintains the inter-lock for limited combined movement of parts 32, 33 and 25 through cooperation with the roller 45; but from Fig. XIII it will be noted that the roller 45 normally rides on the outside of the ridge 46 as well as on the outside of the guard 49. This guard 49 is preferably formed as an integral part of the plate 47 and is therefore fixed relative to the cam ridge 46.

Referring now more particularly to Figs. V and XI it will be observed that the inner permutation member or sleeve 32 has in its upper face a series of holes 50 (in this instance twelve in number) into one of which is placed a spring pressed plunger or tumbler 51, while the outer permutation member or sleeve 33, (Fig. XII) likewise has a circle of holes 52, (preferably twice the number or twenty-four) into one of which is placed a plunger or tumbler 53. Mounted over the permutation members 32, 33 for independent rotation is an actuating member 55 of inverted cup configuration and having an upstanding manipulating knob 56. The depending circumferential apron or flange 57 of the member 55 is received within an annular space resulting from counter-recessing the casing as at 58, and rests on the shoulder incidentally formed. The actuator 55 is held in place within the casing 20 by screws 59 which engage a groove 60 surrounding the apron or flange 57, and its horizontal internal face is provided with a pair of recesses 61 and 62 arranged side by side and allocated directly over the plungers or tumblers 51 and 53 of the permutation members 32, 33. These recesses 61, 62 are abruptly shouldered as shown at 63, 64, the shoulders lying in a common radial line and approached through oppositely inclined surfaces. As a result of this construction the permutation members 32, 33 may be selectively actuated through cooperation of the recesses 61 and 62 with the tumblers 51 and 53 depending upon which direction the actuating member 55 is turned. Thus, when the actuating member 55 is turned clockwise, the outer permutation member 33 follows in the direction of the arrow thereon in Fig. V, and when rotated in the counter or opposite direction, the inner permutation member 32 follows in the direction of the arrow in the same illustration. As an aid to make the shiftings of the actuating member 55 in accordance with the permutation combination predetermined upon as hereinafter noted, said member is provided with an index or pointer 65 for cooperation with a numbered dial 66 secured over a shoulder 67 about the top of the lock housing 20, by means of tie rods 68 which connect with a cover plate 69 closing the lower cavity of said casing.

The operation of the mechanism with the plungers or tumblers 51 and 53 positioned in the permutation members 32, 33 as shown, is as follows:

Assuming the parts of the lock 8 to be occupying arbitrary positions relatively as in Fig. XIII, the actuator member 55 is first turned anti-clockwise until its index 65 points to the number eight on the dial 66. This movement serves to bring the plunger or tumbler 51 between the numbers nine and three of the dial 66 in readiness to be subsequently acted upon. The actuating member 55 is next turned clock-wise to the graduation intermediate nine and ten on the dial 66, thereby engaging the tumbler 53 in its inclined recess 62 and bringing the finger 40 to the position shown in Fig. XIV, in readiness to engage the notch 38 in the operating shaft 25. The actuating member 55 is thereupon again turned anti-clockwise to the number three on the dial 66, leaving the parts just referred to in the positions mentioned, but in the course of its movement engaging the plunger or tumbler 51 in its notch or recess 63 and carrying the inner permutation member 32 around to the position shown in Fig. XV with the aperture 37 in direct registry with the notch 38 in the shaft 25. The finger 40 is thereupon, under urgence of the spring 43, forcibly projected through the aperture 37 and into the notch 38 of the shaft 25. The actuating member 55 is finally given another turn to the right until the index or pointer 65 registers opposite the number one on the dial 66, when the parts clutched as shown in Fig. XV will be carried along together to the final position shown in Fig. VI, the guard 49 serving by cooperation with the roller 45 on the finger 40 to temporarily maintain such coupling for limited combined movement of the aforesaid parts. As a result of the movement imparted to the shaft 25, the arm 26 at its lower end draws upon the valve member 6 against the action of the spring 13, thereby opening the port through the valve 4 for passage of the fuel. As long as lock 8 remains set as shown in Fig. VI, fuel can flow continuously from the storage tank 1 to the carburetor of the automobile in the usual or normal way. A slight movement either of the part 32 or 33 from the final positions of Figs. V and VI through turning of the actuator member 55 in one or the other direction will result in immediate closing of the valve 4. For example, in case the permutation member 33 is turned as indicated by the arrow in Fig. XVII, the roller 45 on finger 40, is immediately engaged by the incline 48 of the cam ridge 46 and said finger thereby withdrawn from the notch 38 in the operating shaft 25. Likewise, shifting of the permutation member 32 in the opposite direction as indicated in Fig. XVI will result in the engagement of its cam projection 39 with the roller 45 on the finger 40, thereby to withdraw the latter from the shaft 25. The permutation combination can, of course, be changed at will by diversified positioning of the tumblers over the wide range afforded through provision of the great number of apertures or holes in the respective permutation members 32, 33. In order to permit shifting of the plate 47 in accordance with the change of combinations, said plate is provided with depending pins 70 which are disposed at diametrically opposite points so as to be registerable with any pair of corresponding apertures 71 of the circular series in the horizontal diaphragm or partition of the lock housing 20.

While I have shown and described my invention as particularly advantageous in connection with fuel supply systems of automobiles, it is obvious that it may be otherwise employed without departing from the spirit thereof.

Having thus described my invention, I claim:

1. The combination with a valve, of a lock comprising permutation members for controlling the valve, said members being movable relatively in different directions; a spring pressed tumbler carried by each of the permutation members, and an actuator with diversely inclined shouldered recesses permitting selection between the tumblers of said permutation members.

2. The combination with a valve, of a lock comprising a valve operating member, a cylindric permutation member with means adapted to engage the valve operating member, and an associate interfitting permutation member controlling coupling of the engaging means with the valve operating member.

3. The combination with a valve, of a lock comprising a valve operating member, a cylindric movable permutation member with means adapted to engage the valve operating member, and an associate interfitting permutation member movable oppositely to the first permutation member to control coupling of the engaging means with the valve operating member.

4. The combination with a valve, of a lock comprising a valve operating member, a rotatable cylindric permutation member with means adapted to engage the valve operating member, and an associate interfitting permutation member rotatable oppositely to the first permutation member to control coupling of the engaging means with the valve operating member.

5. The combination with a valve, of a lock comprising a valve operating member, a cylindric permutation member capable of being coupled with the valve operating member, and an associate interfitted permutation member controlling such coupling.

6. The combination with a valve, of a lock comprising a valve operating member, a cylindric permutation member carrying a finger yieldingly urged toward the valve operating member, and an associate interfitted permutation member controlling access of the finger to the valve operating member.

7. The combination with a valve, of a lock comprising a valve operating member, a permutation member carrying a finger yieldingly urged toward the valve operating member, and an associated permutation member with an aperture permitting access of said finger to the valve operating member.

8. The combination with a valve, of a lock comprising a valve operating shaft, a pair of permutation members in the form of sleeves concentrically mounted for independent rotation on the shaft, the outer sleeve carrying a finger yieldingly urged toward the shaft, and the inner sleeve having an aperture controlling access of the finger to the shaft.

9. The combination with a valve, of a lock comprising an operating shaft, a pair of permutation members in the form of sleeves concentrically mounted for independent rotation in opposite directions on the shaft, the outer sleeve carrying a finger urged toward the shaft, and the inner sleeve having an aperture controlling access of the finger to the shaft.

10. The combination with a valve, of a lock comprising an operating member, and a number of associated permutation members adapted to be coupled for movement in concert to actuate the operating member, means determining the limit of the concerted movement, and means for immediately uncoupling said members when such movement is exceeded.

11. The combination with a valve, of a lock comprising an operating member with a notch, a permutation member carrying a spring pressed finger adapted to be brought into registry with the notch, an interposed permutation member with an aperture adapted to be registered with the notch of the operating member to permit access of the finger to said notch thereby to couple said operating member and the permutation members for movement in concert, and means determining the limit of such concerted movement and for withdrawing the finger when such movement is exceeded.

12. The combination with a valve, of a lock comprising an operating member with a notch, a permutation member carrying a spring pressed finger adapted to be brought into registry with the notch, an associate permutation member movable in a direction opposite to the first, having an aperture permitting access of the finger to the notch of the operating member thereby to couple said operating member and the permutation members for limited movement in concert, and means for immediately withdrawing the finger when such movement is exceeded.

13. The combination with a valve, of a lock comprising an operating member with a notch, a permutation member carrying a spring pressed finger adapted to be brought into registry with the notch, an associate permutation member movable in a direction opposite to the first, having an aperture permitting access of the finger to the notch of the operating member thereby to couple said operating member and the permutation members for limited movement in concert, and means for immediately withdrawing the finger upon shifting of either permutation member beyond the limit of the concerted movement.

14. The combination with a valve, of a lock comprising an operating member having a notch, a permutation member carrying a spring pressed finger adapted to be brought into registry with the notch, an associate permutation member movable in a direction opposite to the first, with an aperture permitting access of the finger to the notch of the operating member thereby to couple said operating member and the permutation members for limited movement in concert, a fixed cam operative to withdraw the finger when the permutation member carrying the same is independently moved, and a cam carried by the apertured permutation member to withdraw the finger when said member is independently moved in the opposite direction.

15. The combination with a valve, of a lock comprising an operating member having notch, a permutation member carrying a spring pressed finger adapted to be brought into registry with the notch, an associate permutation member movable in a direction opposite the first, having an aperture permitting access of the finger to the recess of the operating member thereby to couple said operating member and the permutation members for limited movement in concert, a guard operative upon the finger to maintain such coupling for limited concerted movement of the parts, and means for immediately withdrawing the finger when such movement is exceeded.

In testimony whereof, I have hereunto signed my name at Philadelphia, Pennsylvania, this 1st day of February, 1924.

FREDERICK THOMAS MARTIN.